United States Patent
John

[11] 3,892,438
[45] July 1, 1975

[54] AIR CHANNELING MEANS
[76] Inventor: Chester H. John, P.O. Box 713, Perris, Calif. 92370
[22] Filed: July 12, 1972
[21] Appl. No.: 271,174

Related U.S. Application Data
[63] Continuation-in-part of Ser. No. 856,097, Sept. 8, 1969, abandoned.

[52] U.S. Cl. ............................................. 296/1 S
[51] Int. Cl. ............................................. B60j 9/00
[58] Field of Search .......... 114/122, 67 A; 296/1 S; 244/130; 180/1 FV; 105/2 A

[56] References Cited
UNITED STATES PATENTS
| | | | |
|---|---|---|---|
| 2,725,944 | 12/1955 | Lee et al. | 296/1 S |
| 2,863,695 | 12/1958 | Stamm | 296/1 S |
| 3,721,466 | 3/1973 | Abrams | 296/1 S |

FOREIGN PATENTS OR APPLICATIONS
| | | | |
|---|---|---|---|
| 883,402 | 7/1953 | Germany | 296/1 S |
| 806,758 | 10/1936 | France | 114/122 |

*Primary Examiner*—George E. A. Halvosa
*Assistant Examiner*—Stuart M. Goldstein
*Attorney, Agent, or Firm*—John H. Crowe

[57] ABSTRACT

Air ducts mounted to pass through the bodies of campers or trailers and provide flow paths for air from relatively high pressure to relatively low pressure areas adjacent the outer surfaces of the vehicle bodies. In their most useful forms, the air ducts run from side to side through the vehicle bodies, and serve to reduce air pressure differences between the sides of moving vehicles caught in strong cross winds, and thus protect the vehicles against the danger of turnover in such winds.

2 Claims, 2 Drawing Figures

INVENTOR
CHESTER H. JOHN
BY
John H. Crowe
AGENT 3,892,438

AIR CHANNELING MEANS

CROSS-REFERENCE TO RELATED APPLICATION

This application is a continuation-in-part of my co-pending U.S. application Ser. No. 856,097, filed Sept. 8, 1969 and now abandoned.

BACKGROUND OF THE INVENTION

This invention relates generally to air duct means for channeling the flow of air from relatively high pressure zones to relatively low pressure zones adjacent the bodies of moving vehicles, and more particularly to such means adapted to protect moving vehicles against erratic behavior under the influence of high winds.

Campers, vacationers pulling trailers behind automobiles, and others responsible for the safe conduct of relatively large and bulky vehicles, are constantly faced with the dangerous possibility of encountering high winds. Such winds can arise unexpectedly, in the form of strong currents blowing fairly steadily from one direction, or capricious, buffeting winds, blowing first from one direction and then another. High winds can occur almost anywhere, but are more prevalent in certain areas, such as, for example, the desert regions of the southwestern part of the United States, mountain passes, and long bridges over open stretches of water.

High winds subject moving campers, trailers, and the like, to strong forces which can cause them to sway or fishtail, create a drag on them, or have other harmful effects thereon. These forces often make it difficult for drivers to keep their bulky vehicles on the road and subject the drivers to the strain of remaining constantly alert to cope with sudden emergencies which might arise as a result of erratic behavior on the part of their own, or other, vehicles.

High headwinds acting on a moving camper or trailer result in increased fuel consumption on the part of the vehicle, or its prime mover, to a greater or lesser extent depending upon the degree of streamlining of said vehicle. While many such vehicles are quite streamlined, they can still have relatively large front end surfaces to catch the wind. Consequently, even when these vehicles are traveling in relatively calm air there is wind resistance at their front ends, as a result of their forward movement, and pressure differences exist between their fronts and sides. Additionally, there are pressure differences between their sides and rear ends, since each leaves a partial vacuum in its wake. In the case of strong headwinds, these pressure differences are, of course, magnified, particularly those between the front and sides of the vehicles. Any way of minimizing these differentials, and particularly those between the front and sides of moving campers or trailers, would be of great benefit in reducing the strain on drivers and bringing about savings in fuel consumption.

Where traveling campers or trailers are subjected to high cross-winds, the situation is a lot more serious than when the vehicles are subjected to high headwinds. If such crosswinds are blowing at relatively high speeds, a bulky camper or trailer can be blown off the road, or even overturned before the driver can do anything to prevent the accident. Such incidents are not uncommon in the high winds areas of the Southwest. High winds are considered so dangerous, in fact, for campers, trailers, and the like, that regular warnings are broadcast from Los Angeles radio stations of high wind conditions on certain stretches of highway in the mountain passes and other areas in and around the Greater Los Angeles area. These warnings advise motorists to refrain from driving on the windy stretches of highway until notice is given that the winds have abated to safe driving levels. Drivers have ignored these warnings at their peril, as I can attest from firsthand observation of campers and trailers which have been blown from the road and tumbled over by high winds.

When a bulky vehicle, such as a camper or trailer, is caught in a high crosswind, a relatively high pressure differential is created between its windward and leeward sides. Although the hazards of being caught in high crosswinds have long been known to camper and trailer manufacturers, no way of relieving the resulting pressure differential between the sides of such vehicles has yet, to my knowledge, been provided. This, in spite of the fact that relief of such a pressure differential would eliminate, or reduce, the possibility of vehicle overturn, and consequent injury, or death, of the involved drivers (as well as any passengers who might be present) and damage or destruction of the involved vehicles.

A practical means of correcting the pressure imbalance on the sides of a bulky vehicle caught in high crosswinds would permit the vehicle to be driven, or pulled, through such winds, in cases of emergency or otherwise, so that the driver would not have to sit idly by until the winds subside. This would be of benefit to campers, touring motorists, etc., on tight vacation schedules, as well as to commercial haulers of large mobile homes, semitrailers, and the like, since these latter vehicles are peculiarly vulnerable to the hazards of high crosswinds.

SUMMARY OF THE INVENTION

The air duct means of the present invention are adapted for temporary or permanent installation in or on campers, trailers, and similar types of vehicles, in such a way as to provide flow paths for the channeling of air from high pressure to low pressure areas adjacent the outer walls of the vehicles for alleviation of the harmful effects of the resulting pressure differentials between the walls. The underlying concept here and the structure embodying this concept are simple. In their preferred form, the air duct means include ducts which can be expanded and collapsed, in accordion-like fashion, and suitable hardware to permit the temporary installation of these ducts in camper or trailer bodies between appropriately located windows in the vehicle walls. Because of their accessory hardware and expansible character, the ducts can be quickly and easily installed for use when needed, and as quickly and easily taken down and packed in closet, or other out-of-the-way, spaces when their presence is no longer required.

The expansible air ducts of this invention are preferably of one foot, or larger, diameter, but can be of any size suitable for use in the window installation technique referred to above. To install an air duct in accordance with this technique, the duct is stretched between windows in the interior of a camper, trailer or like vehicle. Where these windows are in the side walls of the vehicle, it is not necessary that they be aligned, since the duct is inherently flexible enough to permit its installation in either a curving or straight path between the windows.

Tubing or ductwork of other than the flexible type described above can also, if desired, be employed for purposes of my invention. For example, sheet metal (aluminum, galvanized steel, or the like) ductwork of rectangular cross section, such as that employed in central heating or air conditioning systems, can be so utilized. Rigid ductwork of this type is particularly suitable for permanent installation in campers, trailers, and the like, to provide fixed air flow channels from high pressure to low pressure areas adjacent the outer vehicle walls. Where such permanent ductwork runs transversely of the vehicle body, it is preferably routed from an opening on one side, up and across the ceiling of the vehicle, then down and out the other side. Or, it can be routed from an opening in one side, down and along the bottom of the vehicle, then up and out the other side of said vehicle.

Ducts with bends such as those just described offer more resistance to air passage than straight ducts, but they nevertheless serve to permit air flow in accordance with present teachings. The permanently installed ducts of this invention can have their ends installed at window openings in vehicle body walls, or at wall openings designed especially for the purpose.

As will be apparent, the air ducts of the present invention, whether of temporarily installable or permanent character, serve to permit the rapid flow of air from higher pressure to lower pressure zones adjacent the outer vehicle walls for at least partial equalization of the air pressure on the walls. The resulting reduction of air pressure differential between the vehicle walls helps to minimize the inherent dangers in such pressure differentials. My novel ductwork provides a simple solution to a troublesome problem at relatively low cost, and can be fashioned from readily available parts and materials with minimal effort.

It is thus a principal object of this invention to provide simplified and relatively inexpensive means for equalizing the wind pressure on the sides of campers, trailers, and the like to minimize the risk of turnover of such vehicles when they are caught in strong cross winds.

It is another object of the invention to provide such means which can be temporarily installed, as needed, between window openings in the sides of campers, trailers, and the like.

Another object of the invention is to provide simplified and relatively inexpensive means for minimizing the harmful effects of strong head winds on moving campers, trailers, and the like, and thereby easing the physical and mental strain on drivers caught in such winds.

Other objects, features and advantages of the invention will become apparent in the light of subsequent disclosures herein.

DESCRIPTION OF THE PREFERRED EMBODIMENTS

Figure 1:
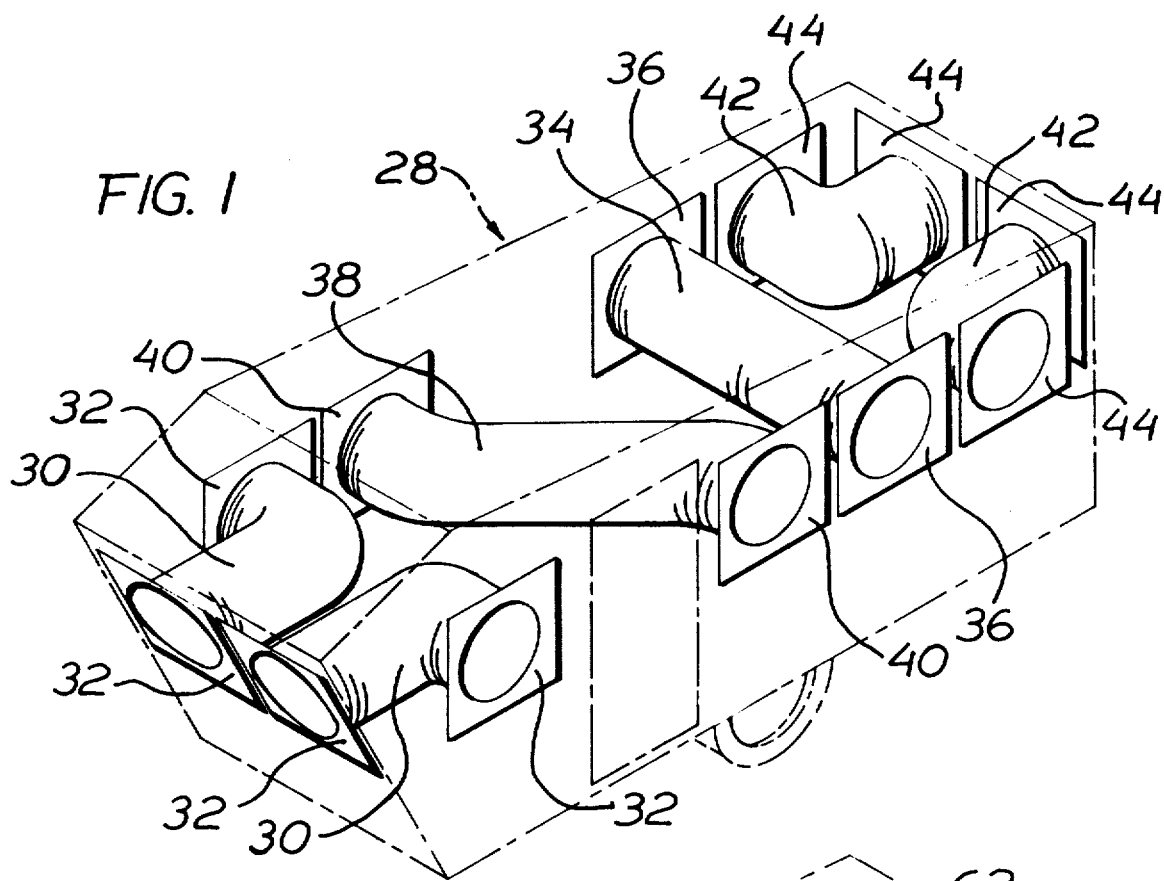
FIG. 1 shows, in perspective, a trailer with pressure relief ducts of temporarily installable character fastened between window openings positioned to permit the funnelling of air from the front to the areas adjacent the outer sides, from one side of the other, and from areas adjacent the sides to the rear, of the trailer, the trailer being shown in phantom-line-outline form.

Considering now the drawing in greater detail, and directing attention first to FIG. 1, that figure shows, in phantom lines, the outline of a typical travel trailer 28, and, in solid lines, temporarily installed ducts for the channeling of air from the front to the sides, from either side to the other, and from the sides to the rear, of the trailer. Thus, there is shown in the front part of the trailer a pair of flexible ducts 30, each fastened at one end in a window opening in the front wall, and at the other end in a window opening in a separate side wall, of the trailer. The ducts, being flexible, are easily bent through the necessary curves to permit their installation in the illustrated manner.

Ducts 30 are preferably of about one foot diameter, but could vary in size as necessary to better fit the windows of the trailer on which they are to be used. The ducts are made from flexible tubing similar to that employed for the exhaustion of hot air from home dryers comprising a tube or sleeve of sheet plastic material fitted around a plurality of aligned metal hoops spaced so there is enough slack therebetween to permit expansion and contraction of the tubing in accordion-like fashion. This type of tubing is readily available in different diameters and its use permits ducts 30 to be compressed into compact bundles for storage in limited spaces between periods of use.

To permit fastening of the ends of flexible ducts 30 in the windows of trailer in the illustrated manner, appropriate window plates 32, sized to fit into the window openings and properly apertured to cooperate with the ducts, are provided. These window plates can be fastened in the window openings to vent the ducts to the surrounding atmosphere when the trailer windows are open. Any conventional method of fastening the window plates in the window openings can be employed. Since trailers vary in window design, the fastening hardware will vary from trailer to trailer, but the provision of such hardware for use in specific instances is well within the skill of the routineer in the art having the present teachings to guide him. For these reasons, and because of the obvious variety of window plate fastening arrangements within the scope of this invention, no window plate fastening arrangement has been specifically illustrated herein.

Window plates 32 can be permanently attached to the ends of ducts 30 in any well-known way, or designed for temporary attachment to the ends of the ducts when the latter are in use. For reasons similar to those given above for the omission of window plate installation details from the present disclosure, details of the fastening arrangement between the ends of ducts 30 and window plates 32 are likewise omitted.

A flexible duct 34, similar to either of ducts 30 in construction and manner of installation, is installed crosswise of the interior of trailer 28, and fastened, by means of a pair of window plates 36, to aligned windows in the sides of the trailer. A second flexible duct 38 is shown in transverse installation within the trailer, except that here the ends of the duct are positioned at nonaligned windows in the trailer walls by means of a pair of window plates 40. In the rear part of the trailer, a pair of flexible ducts 42 connect side and rear windows in the trailer body by means of four cooperating window plates 44.

As will now be evident, when trailer 28 is moving into strong head winds, with ducts 30 installed as shown, these ducts will suck in large volumes of air, at their front openings, and exhaust this air through the trailer side windows to which they are connected. This results in relief of some of the excess air pressure on the front wall of the trailer, and substantial improvement in the stability of the moving vehicle. Even when the moving trailer is not heading into such winds, the ducts bring about at least partial reduction of the resulting pressure differential between its front and sides, with consequent reduction in fuel consumption on the part of the car, or other prime mover, pulling the trailer. Transverse ducts 34 and 38 can be employed separately or together to minimize the pressure differential between the sides of the trailer when it is being pulled through strong cross winds.

The FIG. 1 ducts are temporary in the sense that they lend themselves to relatively quick and easy installation for use when the need arises, and as quick and easy dismantling for storage between periods of use. The installed ducts can be supported in various ways intermediate their ends, all, or at least many, of which are of such obvious character as to require no detailed description here. It should be understood that these trailer ducts, as well as others discussed hereinafter, are merely exemplary of the variety of ductwork within the scope of my invention, and that any one, or combination, of these ducts can be employed for my purpose. Thus, any flexible ductwork for the channeling of air from the front to either, or both, sides of a trailer, in the manner in which either or both of ducts 30 channel air through trailer 28, constitutes one form of my invention. Likewise, ductwork designed for side-to-side installation in a trailer or flexible duct means designed to channel air from openings in one or both sides of the trailer to openings in its rear wall (such as either or both of ducts 42) constitute other forms of the invention. Clearly, then, any one, or combination, of the various ducts illustrated in FIG. 1, with the necessary accessory means for installation thereof in a vehicle as taught herein, falls within the scope of my invention.

Figure 2:
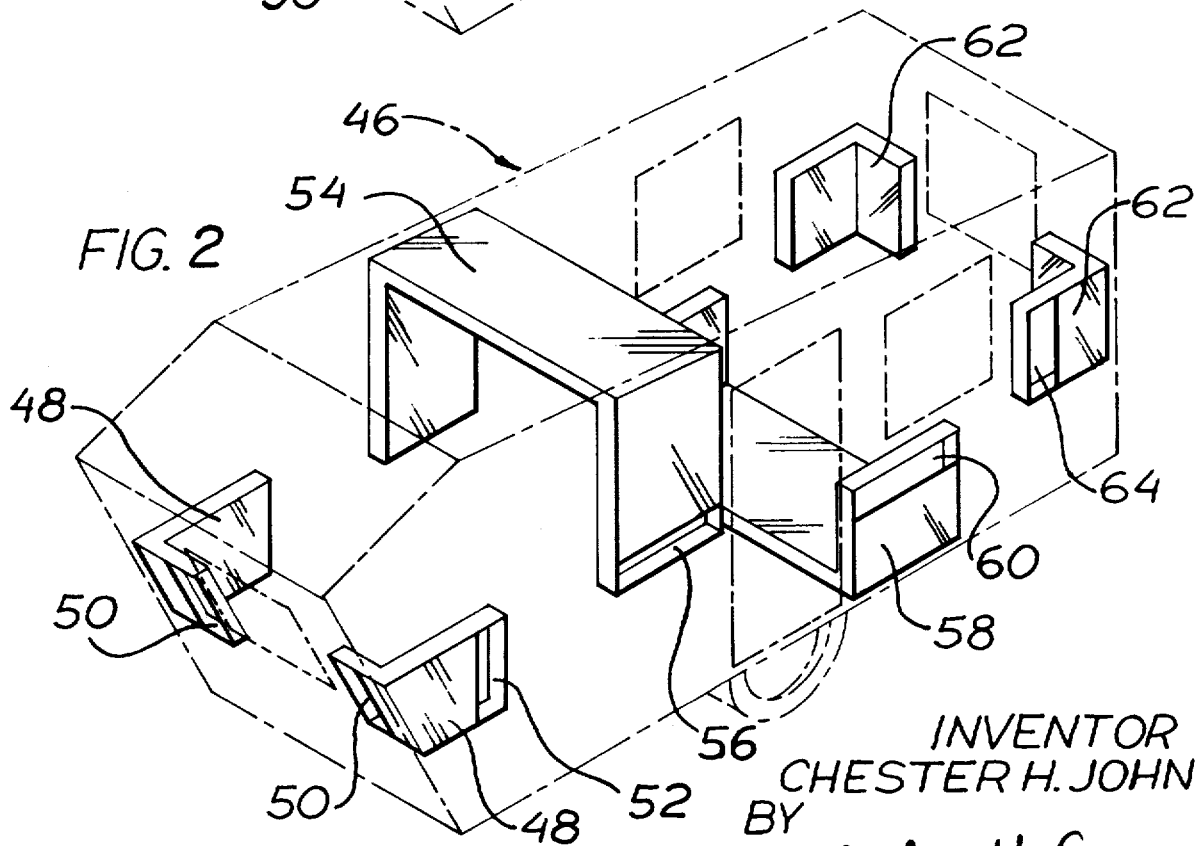
FIG. 2 is another perspective view of a trailer, somewhat similar to the FIG. 1 trailer but with permanently installed air ducts in accordance with this invention incorporated therein, the trailer again being shown in phantom-line-outline form.

FIG. 2 shows, in phantom outline form, a travel trailer 46 similar in shape to trailer 28. Trailer 46 differs internally from trailer 28, however, in having a plurality of wind-channeling ducts of "permanent" character installed therein. Two of these ducts, shown at 48, are designed to receive air through separate openings 50 in the front of the trailer, and exhaust it through a pair of openings 52 (only one of which can be seen in the drawing) in the sides of the trailer body.

Ducts 48 are of generally rectangular cross section, and preferably fabricated from sheet aluminum, galvanized steel, or the like, such as employed in the construction of hot air ducts for central heating systems in homes and other buildings. Because of their permanent nature, ducts 48 are of flattened shape to occupy a minimum of space in the trailer interior. Openings for the intake and exhaust ends of ducts 48 are provided in the front and sides of trailer 46. Any vehicle moving through air creates a so-called bow wave which, in most cases, impacts the sides of the vehicle to set up "high" and "low" pressure zones thereon. For best results, the exhaust openings of "front-to-side" ducts such as ducts 48 (or flexible ducts 30 of FIG. 1) should be situated at the lowest pressure areas on vehicle side walls subjected to bow wave impact. This is not a critical necessity, however, and the ducts will function to at least some extent regardless of where these exhaust openings are located.

At 54 there is shown a permanently installed duct similar in character to ducts 48, but of larger cross-sectional area than either of the latter, running from a first opening 56 in the near side of the trailer body, as seen at FIG. 2, up the inner side of the near trailer wall, across the trailer ceiling, and down the opposite trailer wall, to a second opening 56 in the latter wall. Duct 54 is, of course, designed to permit the flow of air through the trailer body to minimize the pressure differential between the sides of the trailer when it is subjected to the influence of strong cross winds.

Duct 54, similarly to ducts 48, is of generally flattened form, to provide minimal obstruction of the trailer interior, and is routed across the trailer ceiling for the same reason. Here, as well as in the case of the openings in the trailer walls for the ducts 48, openings 56 for duct 54 can be cut, or built, into the trailer walls with little difficulty by those skilled in the art. These ducts can be supported against or adjacent the interior walls, and ceiling, of the trailer in any known or obvious manner, as by means of conventional hardware suitable for the purpose. Consequently, no details of the way in which the ducts are fastened to the trailer walls or ceiling are believed necessary, or included, herein. For similar reasons, no specific details of the way in which the end openings of the ducts are vented to the atmosphere through appropriately sized and located openings in the trailer walls are herein illustrated or described.

Another cross duct, similar to duct 54 but running downwardly from an opening 60 in the near wall of the trailer, as seen in FIG. 2, across the floor, then up the opposite wall of said trailer, to a second opening 60 in the opposite side of the trailer, is shown at 58 in FIG. 2. Two additional ducts, 62, somewhat similar to ducts 48, but running from vented openings 64 in the sides of the trailer to openings in its rear wall, are also shown in FIG. 2. The permanently installed ducts in trailer 46 serve substantially the same purposes as their temporary counterparts in travel trailer 28, although perhaps with less effectiveness because of their flattened forms, and sharp bends where they change directions within the trailer. As in the case of the illustrated ductwork of FIG. 1, the FIG. 2 ductwork is offered to exemplify various forms of permanent ductwork within the scope of my invention, and should not be construed as limitative of the invention to the particular combination of ducts there illustrated. On the contrary, permanent ducts of similar character to either or both of illustrated ducts 54 and 58, for example, fall squarely within the scope of the invention.

The air channeling ductwork of this invention can take forms other than those specifically illustrated in the drawings and described above. In this connection, any duct-like, or equivalent, means capable of routing air from a higher to a lower pressure zone adjacent the outer walls of a vehicle, in accordance with present teachings, is considered to be duct means within the scope of the invention. Such a definition is sufficiently broad to include, for example, structure defining an attic-like space over the top of a recreational vehicle with side vents to provide cross-ventilation therethrough.

An attic-like space of this type could be formed by fitting a cap-like cover over the top of a conventional recreational vehicle and fastening the lower edges of the cover around the front, side and rear walls of the vehicle. A cover such as this would permit the flow of air through the attic-like space thereunder, from vented openings at one side to similar openings at the other side, when the "covered" vehicle is caught in a cross wind, and thus serve the same purpose as more conventional ductwork in accordance with my invention. Where a recreational vehicle is fitted with such a cap-like cover, the cover can be provided with a top vent adapted to be left open, to permit the escape of hot air when the vehicle is standing still, or closed, to permit the maximum flow of air through the attic-like space at the top of the vehicle when it is moving under the influence of cross winds.

The ductwork of this invention falls broadly into two general categories: permanently installed ductwork (as specifically exemplified by the ductwork of FIG. 2), and removably installable ductwork (as specifically exemplified by the flexible ductwork of FIG. 1). By removably installable ductwork is meant ductwork which can be installed in a vehicle for use, or dismantled for storage, by the owner of the vehicle. This ductwork can, of course, differ in structural, and/or other, particulars from the FIG. 1 ductwork. It can be of either rigid or collapsible character, so long as it is capable of temporary installation and removal as taught herein. Examples of the collapsible ductwork here contemplated include, besides the accordion-fold ductwork of FIG. 1, corrugated board ducts which can be telescoped or folded flat for storage when not in use, and the like. The removably installable ductwork of this invention can be designed for use in the channeling of air from higher pressure to lower pressure zones adjacent any of the outer walls of a land vehicle, and is not confined to the particular flowpaths illustrated in FIG. 1. The terms "walls" is employed here, and in the following claims, to denote all enclosing parts of vehicle bodies (such as tops, sides, fronts, bottoms, etc.), as well as temporary partitions, or the like, such as canvas or plastic sheets of the type used to enclose the open sides of large mobile home units being hauled over the public highways. For convenience of reference, all vehicle walls other than the front and rear walls are referred to generically in the claims as axial walls, since they are disposed outwardly around the vehicle axes. The term "axial walls," as here employed, thus encompasses the top, side and bottom walls of the vehicles in question.

The term "land vehicle," as employed herein, is intended to include any bulky unit mounted on a carrier for overland transport, such as a modular housing unit mounted on a flatbed trailer, as well as any of the more conventional land vehicles with self-contained wheels. The term "recreational vehicle" is herein employed in its commonly understood sense to mean any vehicle suitable for recreational use, such as, for example, a travel trailer, camper, van or motor home.

While the novel air duct means of my invention have been herein illustrated and described in what are considered to be preferred embodiments, there are, as indicated above, many variations of these preferred embodiments within the scope of the invention. Certain of these variations have already been mentioned, and others will occur to those skilled in the art in the light of present teachings. Examples of the latter result when noncritical changes are made in the shapes of various parts, or features, of the illustrated duct means; other materials of construction are substituted for the preferred materials mentioned above; certain structural, or other, features of the duct means not critically essential to their proper use and functioning are eliminated; useful, but noncritical, hardware, or other, means are combined with the illustrated ducts; etc.

While this disclosure has stressed the use of my unique ductwork in land vehicles such as campers, trailers, etc., it should be noted that the ductwork has broader use potential than this and can be employed in any capacity for which its unique character suits it. For example, the ductwork is adaptable for use in ships at sea, as well as in land vehicles.

In summary, the scope of the present invention extends to all variant forms thereof encompassed by the language of the following claims.

I claim:

1. Duct means for channeling the flow of air normally surrounding a land recreational vehicle from any higher pressure zone in the exterior areas adjacent the front and axial walls of the vehicle to any lower pressure zone in the exterior areas adjacent the axial and rear walls of the vehicle, other than from a higher pressure zone adjacent the front to a lower pressure zone adjacent the rear wall of said vehicle, said duct means comprising removably installable ductwork and accessory means for maintaining the installed ductwork in position between openings in the vehicular walls so that channeling of the air takes place through said ductwork, said ductwork comprising tubing of the type which can be expanded and collapsed in accordion-like fashion for bending and length adjustment purposes, and said accessory means comprising means to permit the temporary installation of said tubing between vehicle window openings positioned so that said channeling of the flow of air from higher to lower pressure areas adjacent the outer walls of the vehicle takes place through said tubing.

2. In a land recreational vehicle, means for channeling the flow of air normally surrounding said vehicle from any higher pressure zone in the exterior areas adjacent the front and sides of the vehicle to any lower pressure zone in the exterior areas adjacent the sides and rear of the vehicle, other than from a higher pressure zone adjacent the front to a lower pressure zone adjacent the rear of said vehicle, said means comprising flexible tubing of the type which can be expanded and collapsed in accordion-like fashion for bending and length adjustment purposes, and accessory means to permit the temporary installation of said tubing between recreational vehicle window openings positioned so that said channeling of the flow of air from higher to lower pressure areas adjacent the outer walls of the vehicle takes place through said tubing.

* * * * *